United States Patent Office 3,443,189
Patented May 6, 1969

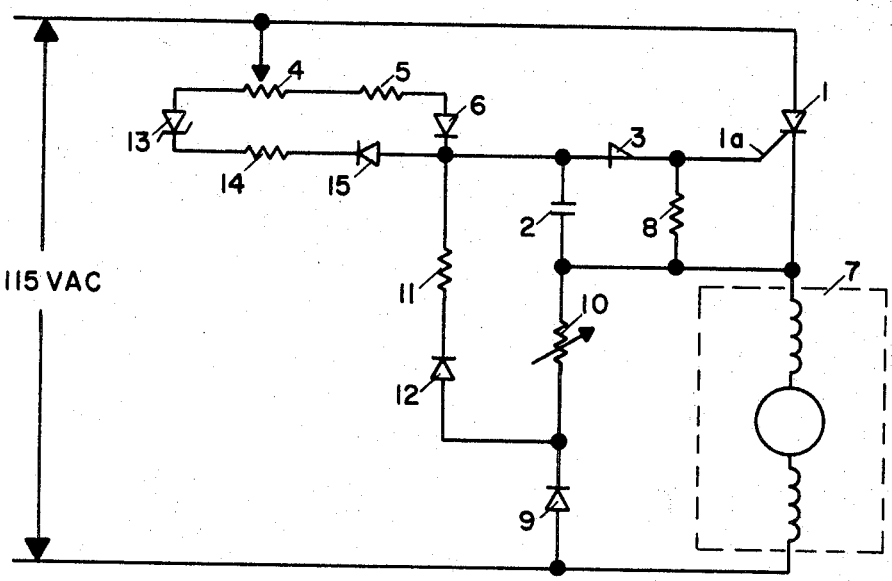
FIG. 1
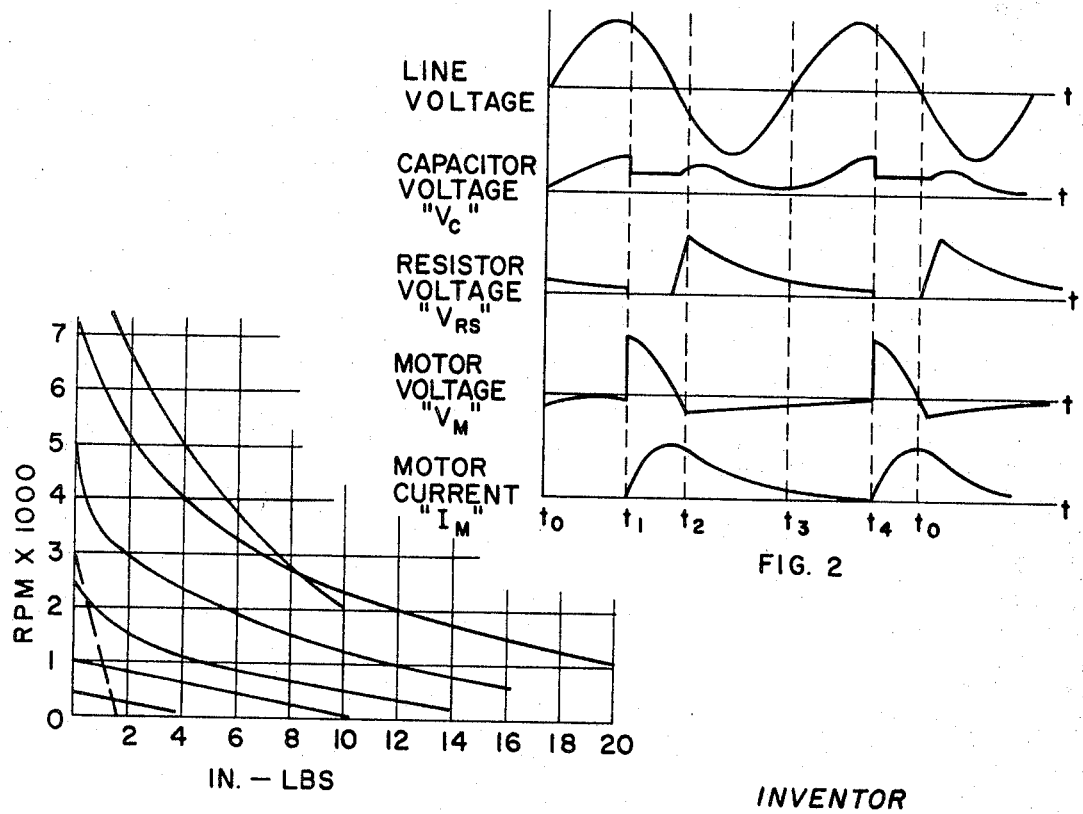
FIG. 2
FIG. 3
INVENTOR
BENJAMIN F. GILBREATH
BY
ATTORNEY

3,443,189
MOTOR CONTROL AND OVERLOAD
PROTECTION
Benjamin F. Gilbreath, 427 Lynn St.,
Richardson, Tex. 75080
Filed Mar. 24, 1967, Ser. No. 625,823
Int. Cl. H02p 5/12, 7/24, 7/58
U.S. Cl. 318—345                               11 Claims

ABSTRACT OF THE DISCLOSURE

An apparatus for controlling the speed of motor driven tools through the use of proportional power control. A thyristor, i.e., silicon controlled rectifier is energized from an alternating current source and supplies power to an inductive load. Variable control is provided for unidirectional power supplied through a half wave silicon controlled rectifier to a rotating machine which has substantial inductance. The control system permits the motor to be operated over a wide range and provides a high degree of feedback at near zero speed without taps on the motor. Overload protection for the system is also provided.

---

In many industrial and commercial tool applications, it is often desirable to control the speed of operation. This is necessary in drill presses, bench lathes, and hand tools such as drills, jig saws, and electrically operated screwdrivers.

There are several well known methods available for controlling the speed of motor driven tools. One of the more common methods is to lower the speed through gear reduction. Another way is through the use of a rheostat in series with the motor. These prior art methods are either costly, bulky or inefficient. A better way to control motor speed is through the use of proportional power control in accordance with this invention.

Before the advent of semiconductors, vacuum tube thyratrons were used to achieve proportional control in speed control systems. These vacuum tubes had relatively short lifetimes and used excessive power.

Semiconductors, and thyristors in particular, are efficient, have relatively long lifetimes and are economically suitable for use in proportional power control systems. Operation of the thyristor family of semiconductor devices is described in a number of readily available sources in the literature. One recommended reference is "Semiconductor Controlled Rectifiers" by Gentry et al., published by Prentice-Hall, 1964. Only such description of the operation of thyristors as is required for the understanding of the control system of this invention will be given in this disclosure.

This invention relates generally to circuits using a thyristor which is commonly referred to as a silicon controlled rectifier or SCR. More specifically this invention relates to SCR's energized from an alternating current source and supplying power to an inductive load. This invention is specially adapted to circuits which use a single phase half wave SCR delivering a unidirectional current to an inductive load.

This invention has application to the variable control of unidirectional power supplied through a half wave SCR to a rotating machine which has substantial inductance such as a series wound or universal motor, the field winding of the generator of a Ward Leonard type variable speed drive, the excitation winding of an eddy current or hysteresis clutch or coupling, or in some cases the field or armature of a separately excited motor.

One object of this invention is to provide a control system which permits a motor to be operated over a wide range and provides a good degree of feedback at near zero speed, without taps on the motor.

Another object of this invention is to provide line compensation to prevent the motor speed from changing with changes in the line voltage.

A further object of this invention is to provide overload protection for the speed control system.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages derived therefrom will be readily understood by those skilled in the art.

In the drawings:

FIGURE 1 is a schematic arrangement of an electrical circuit according to the invention.

FIGURE 2 shows waveforms used to explain the operation of the circuit of this invention.

FIGURE 3 shows the speed torque characteristics of a series motor that is driven with the circuit of this invention.

Figure 4:
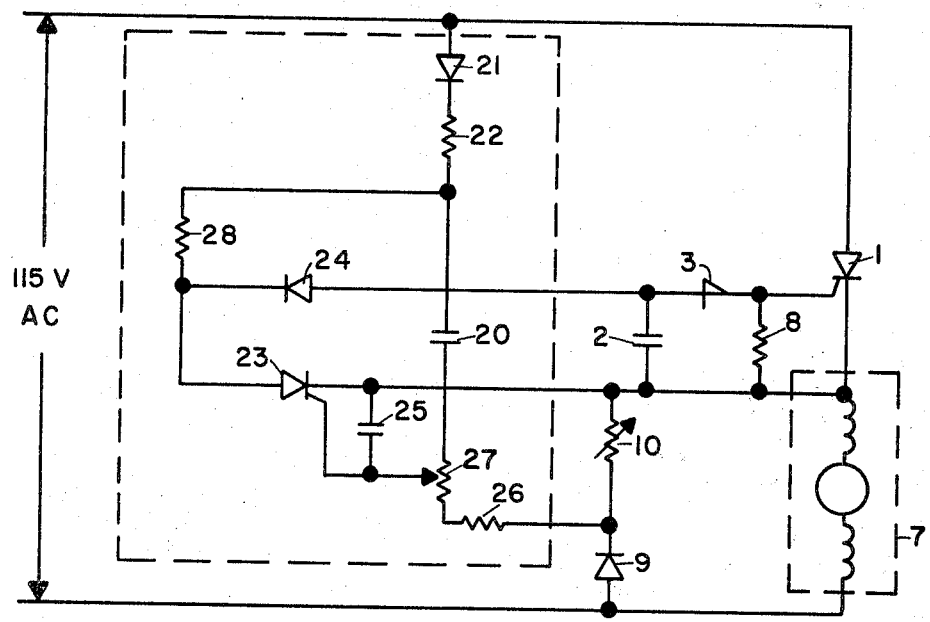
FIGURE 4 is a schematic arrangement of an overload protector circuit, said circuit being set off in a dashed line border.

The mode of operation of the speed control is as follows:

When a source of alternating voltage is applied to the circuit, the silicon controlled rectifier 1 must conduct for operation of the motor 7 to commence. To gate the silicon controlled rectifier 1, capacitor 2 is charged to the breakover voltage of trigger diode 3, through resistors 4 and 5, diode 6, and the motor 7. This charging current is very small and has no effect on motor torque.

It should be noted that the trigger diode 3 does not exhibit zero forward voltage drop after breakover, but instead has a down voltage only several volts lower than its breakover potential. Assuming that the bearkover voltage of trigger diode 3 is 32 volts, the down voltage may be 28 volts.

When the capacitor 2 voltage reaches the breakover voltage of the trigger diode 3, the trigger diode 3 conducts and discharges the capacitor 2 through the gate 1a of the silicon controlled rectifier 1 very rapidly. Resistor 8 is used to desensitize the silicon controlled rectifier 1, gate 1a and prevent false firing from transients. The silicon controlled rectifier 1 becomes conductive and applies the line voltage to the motor 7. The motor 7 will then draw current and develop torque.

From FIGURE 2, it is seen that the line voltage is applied to the motor 7 instantaneously at time $t_1$. The motor 7 current increases rapidly up to a maximum that occurs when the line voltage is near zero. From line voltage zero to time $t_2$, the motor 7 current transfers from the line to circulating through diode 9 and resistor 10.

When the circulating current through resistor 10 is large enough to generate a voltage larger than the voltage on the capacitor 2, the capacitor 2 is charged through the resistor 11 and diode 12. This additional charge is seen on the capacitor 2 voltage curve at time $t_2$. When the negative line voltage exceeds the Zener voltage of Zener diode 13, the capacitor 2 is discharged through resistors 4 and 14, Zener diode 13, and diode 15. This capacitor 2 discharge is seen on the curve between time $t_2$ and time $t_3$. At time $t_3$, the line goes positive and the above described series of events are repeated.

The speed of the motor 7 is determined by the firing angle of the silicon controlled rectifier 1. The silicon controlled rectifier 1 fires when the capacitor 2 voltage reaches the breakover voltage of the trigger diode 3. The capacitor 2 charge is acted on by three sources before charging to the breakover voltage of the trigger diode 3. Each of these sources provides a specific function in the speed control. These functions are:

(1) "Speed setting" is obtained through resistors 4 and 5 and diode 6. This circuit charges the capacitor 2 and provides gating power for the silicon controlled rectifier 1.

(2) "Feedback" is obtained through the diode 12 and resistor 11. The greater the load on the motor 7, the greater is the current through the motor 7, and the greater is the voltage across resistor 10. This voltage across resistor 10 is used to add charge to the capacitor 2. The charge added to the capacitor 2 adds to the "speed setting" charge and causes the silicon controlled rectifier 1 to fire earlier in the cycle. The earlier firing increases the power applied to the motor 7 and makes the motor 7 maintain speed with changing loads.

(3) "Line voltage compensation" is obtained through resistors 4 and 14, Zener diode 13, and diode 15. Where the line voltage is more negative than the Zener voltage of Zener diode 13, the capacitor 2 is discharged to some extent. The greater the line voltage, the more the capacitor 2 discharges. This discharging of the capacitor 2 causes the silicon controlled rectifier 1 to fire later. When the line voltage increases, the silicon controlled rectifier 1 firing angle is delayed, and when the silicon controlled rectifier 1 firing angle is delayed the line voltage increases thus maintaining constant power to the motor 7.

FIGURE 3 as noted illustrates speed-torque characteristics of a series motor that is driven with the circuit of FIGURE 1. The motor used was a Robbins and Myers of Springfield, Ohio, ½ HP motor and in the graph the ordinate axis represents r.p.m. and the abscissa represents torque in inch pounds.

The overload protector circuit of FIGURE 4 detects the motor 7 current and shuts the system down when the motor 7 current becomes excessive. When power is first applied to the circuit of FIGURE 4, capacitor 20 is charged to a high voltage through diode 21 and resistor 22. Silicon controlled rectifier 23 is blocking and will not allow discharge of the capacitor 20. Diode 24 is back biased and will not interfere with the charge on capacitor 2. The voltage across resistor 10, which is a function of motor 7 current, is divided down and applied to the gate of silicon controlled rectifier 23. Capacitor 25 filters this gate voltage and provides a time delay. Should the motor 7 current become excessive the voltage applied to the gate of silicon controlled rectifier 23 will be large enough to fire silicon controlled rectifier 23. Silicon controlled rectifier 23 conducts and discharges capacitor 2. Any additional charge applied to capacitor 2 will also be conducted away through silicon controlled rectifier 23. Silicon controlled rectifier 1 will not receive any more gating pulses and will shut off all power to the motor 7.

To restore operation of the circuit, the voltage must be removed from the system and reapplied. Removal of the line voltage will allow silicon controlled rectifier 23 to regain its blocking state.

Resistor 26 and resistor 27 are used to divide down the voltage that is developed across resistor 10 and provide a high impedance path to charge capacitor 25. If this high impedance path was not provided, the large starting currents of the motor 7 would charge the capacitor 25 rapidly and trip the "overload" circuit each time an attempt was made to start the motor 7.

Resistor 28 provides a "holding current" $I_H$ path for silicon controlled rectifier 23. The time constant of resistor 28 and capacitor 20 must be such that there is always "holding current" flowing through the silicon controlled rectifier 23 at all times during the positive and negative half cycles. If the "holding current" should be interrupted, the silicon controlled rectifier 23 would regain its blocking state, and power would be reapplied to the motor without manual resetting.

Figure 5:
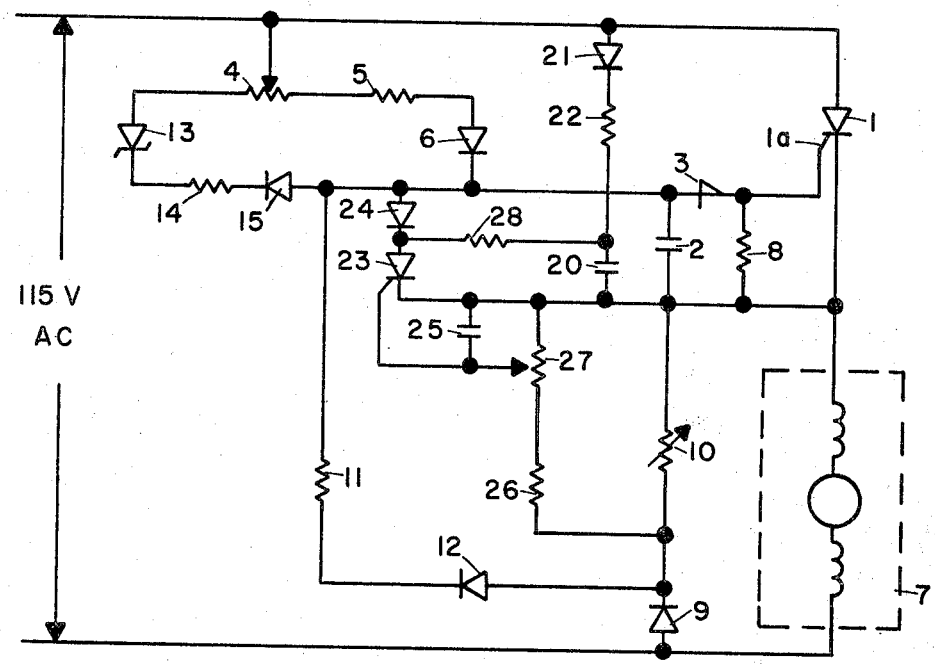
FIGURE 5 is a schematic diagram of the complete circuitry of this invention including motor control and overload protector.

FIGURE 5 as noted is a complete schematic diagram of the motor control circuit of FIGURE 1 incorporating the overload protector of FIGURE 4.

In summation, the invention includes among other features:

(1) A speed control circuit for a series motor with feedback, which does not use taps on the motor or other speed indicating devices.

(2) A speed control circuit for a series motor with the feedback proportioned to motor current.

(3) A circuit that provides a range of output powers that are independent of variations in line voltage.

(4) An all electronic overload circuit which will shut the system down should the motor current become excessive.

(5) An all electronic overload circuit that requires removal of line voltage to restore operation.

It is, of course, understood that various modifications of the described circuits may be made by persons skilled in the art. Accordingly, it is contemplated that the appended claims will cover any such modifications that fall within the true scope of the invention disclosed in the specification and drawings hereof.

What I claim as my invention and desire to secure by Letters Patent of the United States is:

1. A motor control system which permits a motor to be operated over a wide range and provides speed setting, feedback, and line voltage compensation including:

(a) a silicon controlled rectifier having anode, cathode and gate electrodes, the anode electrode of the silicon controlled rectifier being adapted for connection to an alternating current source, and the cathode electrode of the silicon controlled rectifier being connected to one side of the motor to be controlled, the other side of the motor to be controlled being adapted for connection to an alternating current source, (b) a network connected to the gate electrode of the silicon controlled rectifier, said network including a first and a second diode, a Zener diode, and a first, a second, and a third resistor wherein the connection from the gate electrode of the silicon controlled rectifier is between the cathode electrode of the first diode and the anode electrode of the second diode, the first and second resistors are connected to each other, the other end of the second resistor is connected to the anode of the first diode, the other end of the first resistor is connected to the anode of the Zener diode and the third resistor is connected between the cathode of the Zener diode and the cathode of the second diode, (c) a fourth resistor and a third diode, the third diode having its cathode in series with the fourth resistor, the other end of the fourth resistor being connected to the point of juncture of the network with the gate electrode of the silicon controlled rectifier, and the anode of the third diode being connected to the line from the motor adapted for connection to an alternating current source, (d) a capacitor connected at one end between the gate electrode of the silicon controlled rectifier and the point of juncture of the network with the gate electrode of the silicon controlled rectifier and connected at its other end between the cathode electrode of the silicon controlled rectifier and the motor to be controlled, and (e) a fifth resistor connected at one end to the point of juncture of the capacitor with the cathode electrode of the silicon controlled rectifier and connected at its other end between the anode electrode of the third diode and the line from the motor adapted for connection to an alternating current source.

2. A motor control system as described in claim 1 in which the first resistor is a potentiometer having its sliding contact connected between the anode electrode of the silicon controlled rectifier and the extension of the anode electrode of the silicon controlled rectifier adapted for connection to an alternating current source.

3. A motor control system as described in claim 1 in which the fifth resistor is a variable resistor.

4. A motor control system as described in claim 1 including a trigger diode connected between the gate electrode of the silicon controlled rectifier and the capacitor so that when the capacitor voltage reaches the breakover voltage of the trigger diode, the trigger diode conducts current and discharges the capacitor through the gate electrode of the silicon controlled rectifier.

5. A motor control system as described in claim 1 including a sixth resistor connected in parallel with the capacitor between the trigger diode and the gate electrode of the silicon controlled rectifier.

6. A motor control system as described in claim 5 including a fourth diode having its cathode electrode connected to the juncture of the fifth resistor and the third diode and its anode electrode connected to the end of the motor to be controlled which is adapted for connection to an alternating current source.

7. A motor control system as described in claim 6 including means for protection from overload which detects the current of the motor to be controlled and shuts the system down when the motor current becomes excessive.

8. A motor control system as described in claim 7 in which the means for protection from overload includes:
  (a) a second silicon controlled rectifier,
  (b) a fifth diode, having its anode electrode connected between the anode electrode of the first silicon controlled rectifier and the means adapted for connection to an alternating current source,
  (c) a seventh resistor connected at one end to the cathode electrode of the fifth diode,
  (d) a second capacitor connected at one end to the other end of the seventh resistor and connected at its other end to the line from the cathode electrode of the first silicon controlled rectifier which line is first connected to the sixth resistor and the first capacitor, said line extending from the second capacitor to the cathode electrode of the second silicon controlled rectifier,
  (e) a sixth diode having its cathode electrode connected to the anode electrode of the second silicon controlled rectifier and its anode electrode connected to the network between the cathode electrode of the first diode and the point of connection of the fourth resistor with the network, and
  (f) a third capacitor connected between the gate electrode and cathode electrode of the second silicon controlled rectifier.

9. A motor control system as described in claim 8 including an eighth resistor connected at one end between the cathode electrode of the sixth diode and the anode electrode of the second silicon controlled rectifier and connected at its other end between the second capacitor and the seventh resistor.

10. A motor control system as described in claim 9 including a ninth and a tenth resistor connected in series with each other, the other end of the ninth resistor being connected to the cathode electrode of the second silicon controlled rectifier and the other end of the tenth resistor being connected between the fifth resistor and the cathode electrode of the fourth diode.

11. A motor control system as described in claim 10 in which the ninth resistor is a potentiometer whose sliding contact is connected to the juncture of the third capacitor and the gate of the second silicon controlled rectifier.

References Cited
UNITED STATES PATENTS

| | | | |
|---|---|---|---|
| 3,202,899 | 8/1965 | Gambill et al. | 318—345 X |
| 3,237,073 | 2/1966 | Bartley et al. | 318—345 X |
| 3,242,410 | 3/1966 | Cockrell | 318—345 X |
| 3,271,648 | 9/1966 | Weed | 318—345 X |
| 3,305,716 | 2/1967 | Wigington | 318—345 X |
| 3,393,353 | 7/1968 | Martin | 318—345 X |

ORIS L. RADER, *Primary Examiner.*

E. SUTTON, *Assistant Examiner.*

U.S. Cl. X.R.

318—332